(12) United States Patent
Muguda

(10) Patent No.: US 9,443,087 B2
(45) Date of Patent: Sep. 13, 2016

(54) SYNCHRONIZATION OF TRANSACTIONAL DATA AND ANALYTICAL DATA BETWEEN DATA CENTERS

(71) Applicant: Naveenkumar Muguda, Karnataka (IN)

(72) Inventor: Naveenkumar Muguda, Karnataka (IN)

(73) Assignee: Apigee Corporation, Palo Alto, CA (US)

( * ) Notice: Subject to any disclaimer, the term of this patent is extended or adjusted under 35 U.S.C. 154(b) by 323 days.

(21) Appl. No.: 13/789,697

(22) Filed: Mar. 8, 2013

(65) Prior Publication Data

US 2014/0258227 A1 Sep. 11, 2014

(51) Int. Cl.
*G06F 7/00* (2006.01)
*G06F 17/30* (2006.01)
*G06F 21/60* (2013.01)
*G06F 17/40* (2006.01)
*G06Q 10/06* (2012.01)
*G06F 21/62* (2013.01)

(52) U.S. Cl.
CPC .............. *G06F 21/60* (2013.01); *G06F 17/40* (2013.01); *G06F 21/6218* (2013.01); *G06Q 10/063* (2013.01); *G06F 2221/2101* (2013.01)

(58) Field of Classification Search
CPC ............... G06F 17/30581; G06F 21/6218; G06F 17/30598
USPC .......................... 707/607, 620, 624
See application file for complete search history.

(56) References Cited

U.S. PATENT DOCUMENTS

| | | | |
|---|---|---|---|
| 2008/0178278 A1* | 7/2008 | Grinstein | H04L 63/0227 726/12 |
| 2010/0205541 A1* | 8/2010 | Rapaport et al. | 715/753 |
| 2013/0268357 A1* | 10/2013 | Heath | 705/14.53 |

* cited by examiner

*Primary Examiner* — Md. I Uddin
(74) *Attorney, Agent, or Firm* — Kanika Radhakrishnan

(57) ABSTRACT

Synchronization of transactional data and analytical data between data centers. Metadata is received by a transactional system from a user interface included in a customer data center. The metadata is then forwarded from the customer data center to an analytical system in a master data center. Data is forwarded from the customer data center to the master data center, the data being encrypted with a key uniquely associated with a customer. Role creation calls to create roles for one or more users associated with the customer data center are subsequently detected. The role creation calls crossing a data center boundary are further masqueraded.

13 Claims, 4 Drawing Sheets

SYNCHRONIZATION OF TRANSACTIONAL DATA AND ANALYTICAL DATA BETWEEN DATA CENTERS

TECHNICAL FIELD

Embodiments of the disclosure relate generally to the field of enterprise systems, and more specifically, to synchronization of transactional data and analytical data between data centers.

BACKGROUND

Transactional systems and analytical systems are key components of many enterprise systems. Such systems are typically co-located within a single data center and are hence part of one administrative domain. FIG. 1 is a block diagram of a single data center system 100, in accordance with prior art. The single data center system 100 includes a transactional system 105, an analytical system 110, a user management unit 115, an ephemeral data storage 120, a user interface unit 125, and a metadata store 130. The transactional system 105 and the analytical system 110 can accept data of different schemas. The data is ephemerally stored in the ephemeral data storage 120. The metadata and the data are further used by the analytical system 110. The user management unit 115 manages users for both the transactional system 105 and the analytical system 110. The user interface unit 125 initiates queries. As the transactional system 105 and the analytical system 110 are run within the single data center system 100, user authentication and authorization systems are shared. Users are added to the single data center system 100 and other systems control access to corresponding resources by building a security model, for example a role based access model. However, business dynamics might necessitate need for the transactional system 105 and the analytical system 110 to be split across different data centers due to financial benefits, skills of personnel, technical or business policies.

The transactional system 105 and the analytical system 110 can also be located in a multi data center system. The transactional system 105 runs in a customer data center, which is under control of one customer, and the analytical system 110 runs in a multi-tenant and shared setup, with secure data and configuration flow, with federated and independent user management. However, there is only unidirectional flow between the customer data center and the multi-tenant data center or a master data center. As both the transactional system 105 and the analytical system 110 are run across the multi data center system having different administrative realms, there are issues concerning data security, user credentials, dependent transparency, and multi tenancy. Additionally, the transactional system 105 and the analytical system 110 are agnostic to dual modes of consumption.

In light of the foregoing discussion, there exists a need for synchronizing transactional data and analytical data between data centers.

SUMMARY

The above-mentioned needs are met by a method, a multi data center system, and a computer program product for synchronizing transactional data and analytical data between data centers.

An example of a method of synchronizing transactional data and analytical data between data centers includes receiving metadata by a transactional system from a user interface included in a customer data center. The method includes forwarding the metadata from the customer data center to an analytical system in a master data center. The method further includes forwarding data from the customer data center to the master data center, wherein the data is encrypted with a key uniquely associated with a customer. Further, the method includes detecting role creation calls to create roles for one or more users associated with the customer data center. Moreover, the method includes masquerading the role creation calls crossing a data center boundary.

An example of a multi data center system for synchronizing transactional data and analytical data includes a customer data center and a master data center. The customer data center includes a transactional system; a user interface that receives metadata; a transactional sniffer unit that detects the metadata; a first ephemeral data storage unit that receives data from the transactional system; a data forwarder that forwards the data to the master data center; a metadata store that stores the metadata and the data; a role masquerader unit that masquerades role creation calls crossing a data center boundary; an analytical proxy unit that routes traffic from the customer data center to the master data center; a first user management unit that manages user credentials of one or more users associated with the customer data center; and a user management sniffer unit that detects role creation calls to create roles for the one or more users associated with the customer data center. The master data center includes an analytical system; a metadata receiver that receives the metadata from the transactional sniffer unit; a metadata storage unit that stores the metadata; a data receiver that receives the data from the data forwarder; a second ephemeral data storage unit that receives data from the transactional system; a credential management interface unit that enables remote resetting of the user credentials; and a second user management unit that manages the one or more users.

A computer program product stored on a non-transitory computer-readable medium that when executed by a processor, performs a method of synchronizing transactional data and analytical data between data centers includes receiving metadata by a transactional system from a user interface included in a customer data center. The computer program product includes forwarding the metadata from the customer data center to an analytical system in a master data center. The computer program product further includes forwarding data from the customer data center to the master data center, wherein the data is encrypted with a key uniquely associated with a customer. Further, the computer program product includes detecting role creation calls to create roles for one or more users associated with the customer data center. Moreover, the computer program product includes masquerading the role creation calls crossing a data center boundary.

The features and advantages described in this summary and in the following detailed description are not all-inclusive, and particularly, many additional features and advantages will be apparent to one of ordinary skill in the relevant art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

BRIEF DESCRIPTION OF THE FIGURES

In the following drawings like reference numbers are used to refer to like elements. Although the following figures depict various examples of the disclosure, the disclosure is not limited to the examples depicted in the figures.

DETAILED DESCRIPTION OF THE EMBODIMENTS

The above-mentioned needs are met by a method, a multi data center system, and a computer program product for synchronizing transactional data and analytical data between data centers. The following detailed description is intended to provide example implementations to one of ordinary skill in the art, and is not intended to limit the invention to the explicit disclosure, as one or ordinary skill in the art will understand that variations can be substituted that are within the scope of the invention as described.

Figure 1:
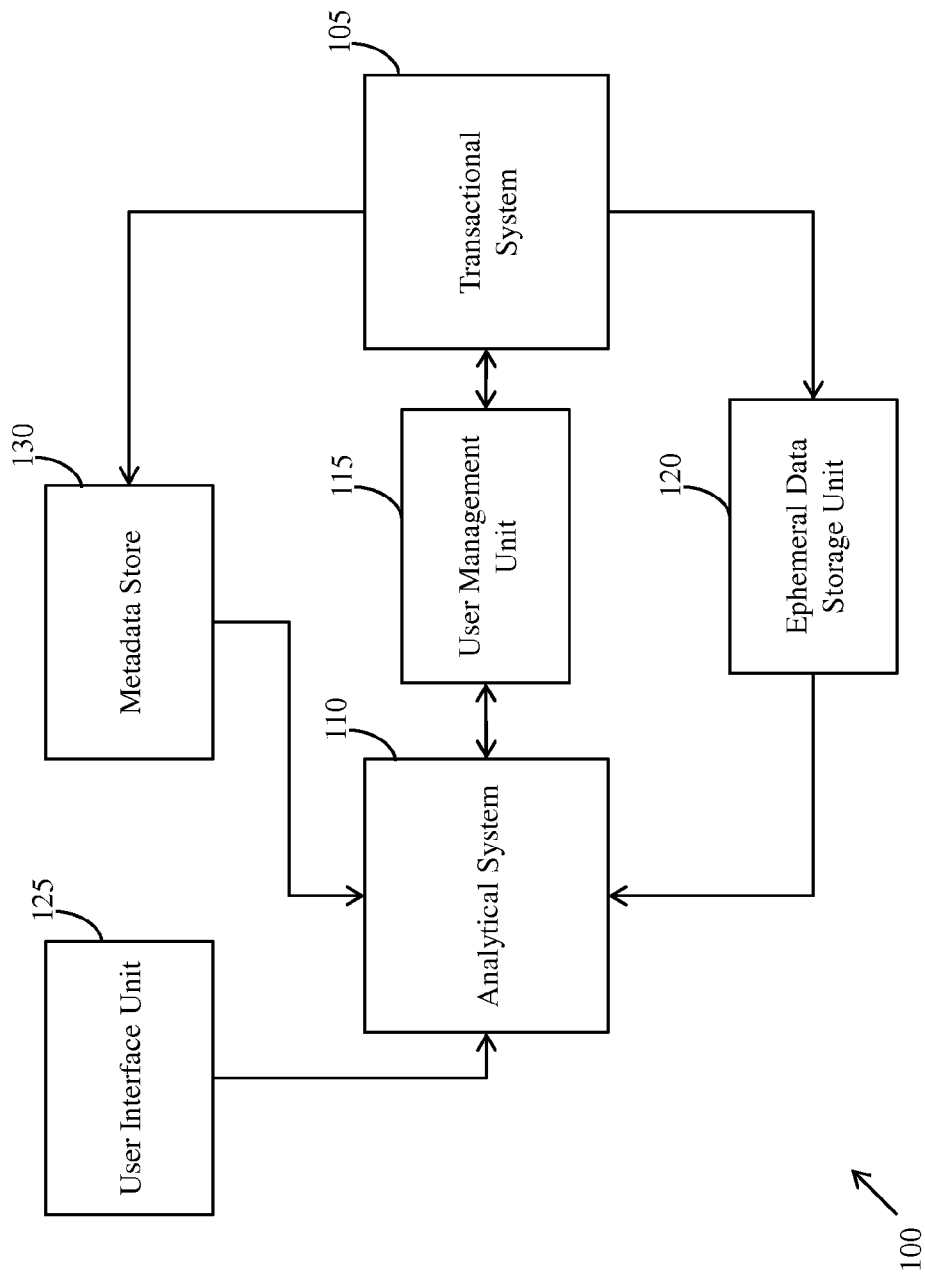
FIG. 1 is a block diagram of a single data center, in accordance with prior art.
Figure 2:
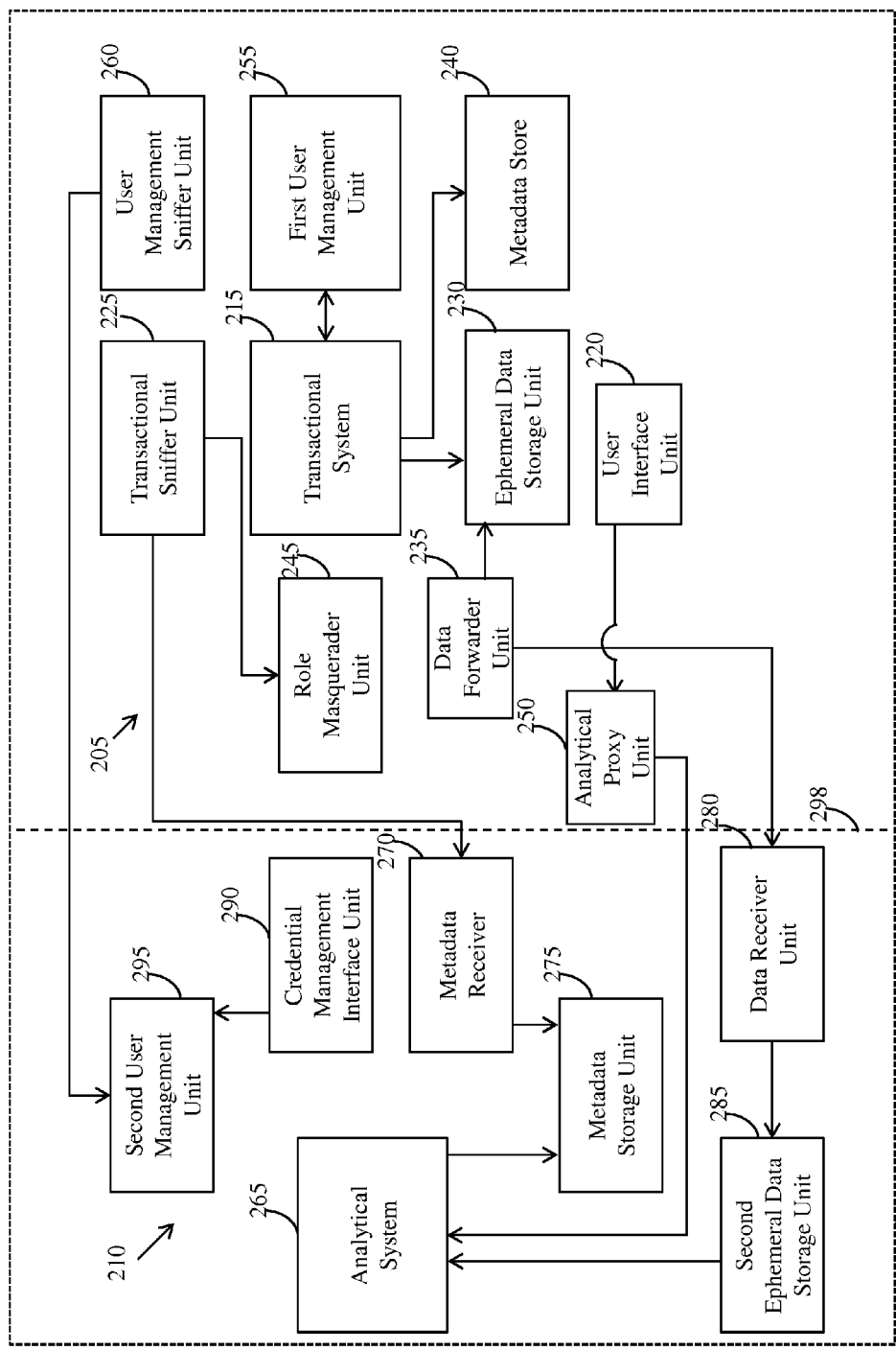
FIG. 2 is a block diagram of a multi data center system, in accordance with one embodiment.

FIG. 2 is a block diagram of a multi data center system 200, in accordance with one embodiment. The multi data center system 200 includes a customer data center 205 and a master data center 210. The customer data center 205 includes a transactional system 215, a user interface unit 220, a transactional sniffer unit 225, a first ephemeral data storage unit 230, a data forwarder unit 235, a metadata store 240, a role masquerader unit 245, an analytical proxy unit 250, a first user management unit 255, and a user management sniffer unit 260. The master data center 210 includes an analytical system 265, a metadata receiver 270, a metadata storage unit 275, a data receiver unit 280, a second ephemeral data storage unit 285, a credential management interface unit 290, and a second user management unit 295.

The transactional system 215 deals with transactional data. The transactional data include elements that support on-going operations of an organization and are included in application systems that automate key business processes. The key business processes can include areas, for example sales, service, order management, manufacturing, purchasing, billing, accounts receivable and accounts payable. Commonly, the transactional data refers to data that is created and updated within operational systems. Examples of the transactional data include, but are not limited to, time, place, price, discount, payment methods, used at point of sale. The transactional data is normally stored within normalized tables within Online Transaction Processing (OLTP) systems and are designed for integrity. Rather than being objects of a transaction, for example customer or product, the transactional data is a describing data including time and numeric values.

The analytical system 265 deals with analytical data. The analytical data includes numerical values, metrics, and measurements that provide business intelligence and support organizational decision making. Typically, the analytical data is stored in Online Analytical Processing (OLAP) repositories optimized for decision support, for example enterprise data warehouses and department data marts. The analytical data is characterized as being facts and numerical values in a dimensional model. Normally, the analytical data resides in fact tables surrounded by key dimensions, for example customer, product, account, location, and date or time. However, the analytical data is defined as numerical measurements rather than being the describing data.

The user interface unit 220 in the customer data center 205 receives metadata. The user interface unit 220 also initiates queries that need to be serviced by the analytical system 265 and a data forwarder unit 235.

The transactional sniffer unit 225 detects the metadata that is received by the user interface unit 220. The metadata is further forwarded from the transactional sniffer unit 225 to the metadata receiver 270 in the analytical system 265. The metadata receiver 270 receives the metadata from the transactional sniffer unit and stores the metadata in the metadata storage unit 275. The metadata is further used by the analytical system 265 for its operations. In one embodiment, the transactional sniffer unit 225 can cause sensitive operations to the metadata to fail in case of intra data center network failures. This approach prevents metadata inconsistencies between the customer data center 205 and the master data center 210.

The first ephemeral data storage unit 230 receives data that is forwarded from the transactional system 205. The data is then sent to the data forwarder unit 235 that further forwards the data to the data receiver unit 280 in the master data center 210. The data is encrypted with a key uniquely associated with a customer. Encryption can be performed for communication between the first ephemeral data storage unit 230 and the second ephemeral data storage unit 285. The key is unique per customer. Hence, one customer can be prevented from reading the data of another customer. The metadata store 240 stores the metadata and the data. The data receiver unit 280 receives the data from the data forwarder unit 235 and stores the data in the second ephemeral data storage unit 285. In case of temporary network failures between the customer data center 205 and the master data center 210, the first ephemeral data storage unit 230 can still receive and ephemerally store the data, providing system resilience against network failures.

Metadata calls to the analytical system 210 need to be protected by a user authentication system. In the multi data center system 200, the user management sniffer unit 260 is hence used in front of the first user management unit 255. The user management sniffer unit 260 detects role creation calls to create roles for the one or more users associated with the customer data center 205. In some embodiments, one unique user per role is created in the master data center 210. When the metadata calls are made in context of a user, local to the customer data center 205, the metadata calls crossing a data center boundary 298 are masqueraded as the user corresponding to the role that the user had in the master data center 210. In the master data center 210, there is a set of such roles for traffic originating from each of multiple customer data centers. The role masquerader unit 245 masquerades the role creation calls and other role sensitive calls crossing the data center boundary 298.

The first user management unit 255 manages user credentials of the users associated with the customer data center 205. The first user management unit 255 can update or delete the user credentials as desired. However, the role creation calls are authenticated within the customer data center 205 before a masqueraded call ensures right authorization for cross data center traffic In some embodiments, there are a higher number of users in the user management unit 255 running in the customer data center 205 as compared to number of users corresponding to the customer in the master data center 210.

The analytical proxy unit 250 routes traffic from the customer data center 205 to the master data center 210. The analytical proxy unit 250 implements a similar interface as the analytical system 265, but routes the traffic to the master data center 210, upon the user masquerading. The traffic entering the master data center 210 is secured by credentials, for example user identification and password, that are used from the customer data center 205. This leads to a possibility of user credential leak or theft. Hence, a credential management interface unit 290 is used which runs within the master data center 210, which interfaces and communicates to the second user management unit 295. Such a path allows remote resetting of the user credentials that are secured by the user credentials which are unique to administrators of each customer data center. There are many such user credentials in the master data center 210.

Figure 3:
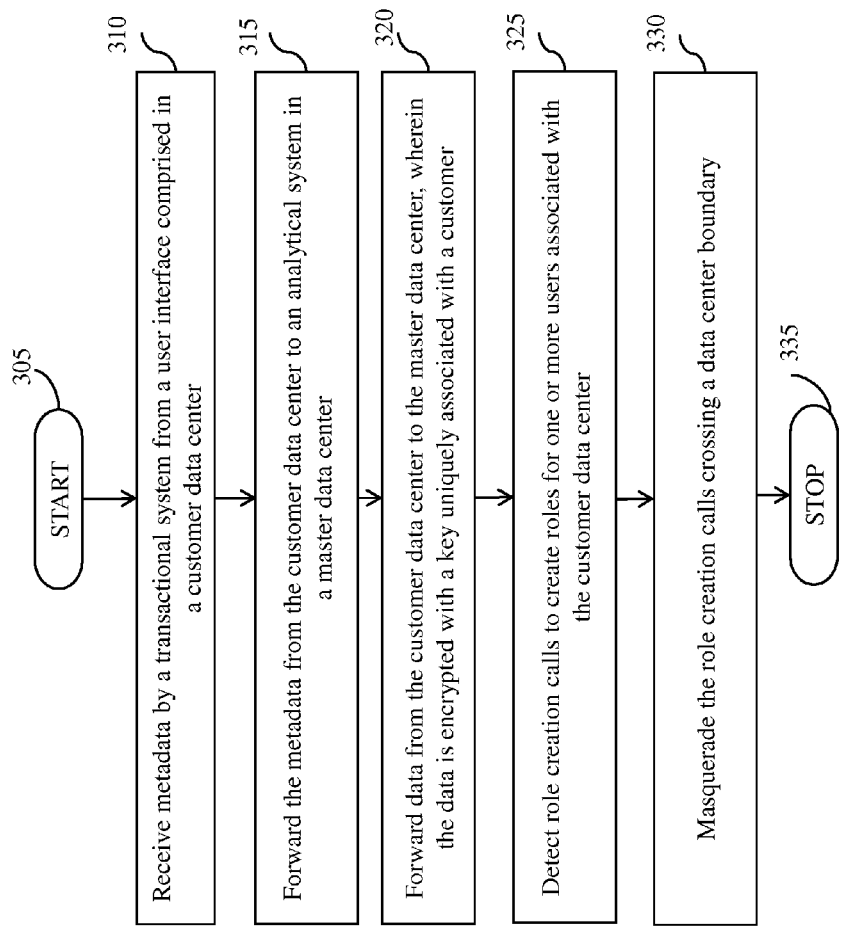
FIG. 3 is a flow diagram illustrating a method of synchronizing transactional data and analytical data between data centers, in accordance with one embodiment.

FIG. 3 is a flow diagram illustrating a method of synchronizing transactional data and analytical data between data centers, in accordance with one embodiment. The method starts at step 305.

At step 310, metadata is received by a transactional system, for example the transactional system 215, from a user interface, for example the user interface unit 220, included in a customer data center, for example the customer data center 205.

At step 315, the metadata is forwarded from the customer data center to an analytical system, for example the analytical system 265, in a master data center, for example the master data center 210.

In some embodiments, the metadata is stored in the master data center.

At step 320, data from the customer data center is forwarded to the master data center, wherein the data is encrypted with a key uniquely associated with a customer.

In some embodiments, the data is stored in the customer data center.

At step 325, role creation calls are detected to create roles for one or more users associated with the customer data center. The role creation calls can be detected using a user management sniffer unit, for example the user management sniffer unit 260.

At step 330, the role creation calls crossing a data center boundary are masqueraded. The role creation calls can be masqueraded using a role masquerader unit, for example the role masquerader unit 245. The method stops at step 335.

In some embodiments, one or more metadata calls are authenticated in the customer data center before masquerading.

In some embodiments, user credentials of the users associated with the customer data center can be managed. The user credentials can be managed using a user management unit, for example the first user management unit 255.

In some embodiments, remote resetting of the user credentials of the one or more users by the master data center are enabled. The remote resetting can be performed using a credential management interface unit, for example a credential management interface unit 290, and another user management unit, for example the second user management unit 295.

Figure 4:
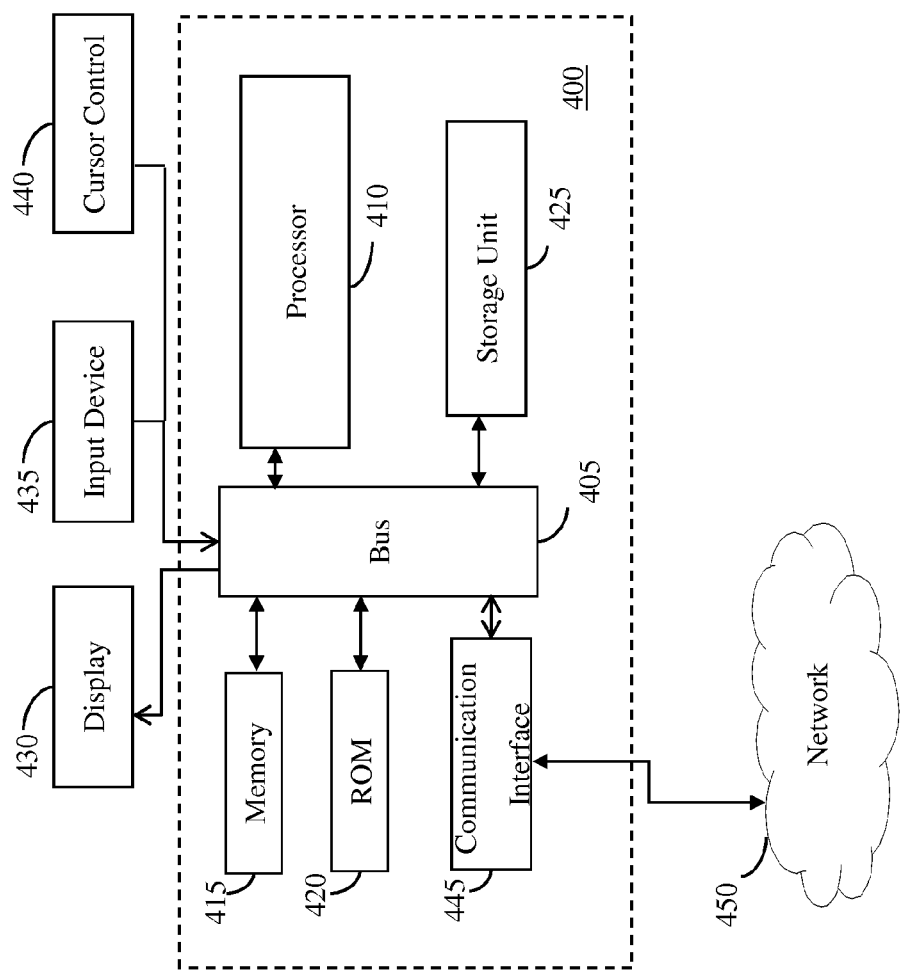
FIG. 4 is a block diagram of an exemplary computer system, in accordance with which various embodiments can be implemented.

FIG. 4 is a block diagram of an exemplary computer system 400, in accordance with which various embodiments can be implemented.

The computer system 400 includes a bus 405 or other communication mechanism for communicating information, and a processor 410 coupled with the bus 405 for processing information. The computer system 400 also includes a memory 415, for example a random access memory (RAM) or other dynamic storage device, coupled to the bus 405 for storing information and instructions to be executed by the processor 410. The memory 415 can be used for storing temporary variables or other intermediate information during execution of instructions by the processor 410. The computer system 400 further includes a read only memory (ROM) 420 or other static storage device coupled to the bus 405 for storing static information and instructions for the processor 410. A storage unit 425, for example a magnetic disk or optical disk, is provided and coupled to the bus 405 for storing information.

The computer system 400 can be coupled via the bus 405 to a display 430, for example a cathode ray tube (CRT), and liquid crystal display (LCD) for displaying information to a user. An input device 435, including alphanumeric and other keys, is coupled to the bus 405 for communicating information and command selections to the processor 410. Another type of user input device is a cursor control 440, for example a mouse, a trackball, or cursor direction keys for communicating direction information and command selections to the processor 410 and for controlling cursor movement on the display 430. The input device 435 can also be included in the display 430, for example a touch screen.

Various embodiments are related to the use of the computer system 400 for implementing the techniques described herein. In some embodiments, the techniques are performed by the computer system 400 in response to the processor 410 executing instructions included in the memory 415. Such instructions can be read into the memory 415 from another machine-readable medium, for example the storage unit 425. Execution of the instructions included in the memory 415 causes the processor 410 to perform the process steps described herein.

In some embodiments, the processor 410 can include one or more processing units for performing one or more functions of the processor 410. The processing units are hardware circuitry used in place of or in combination with software instructions to perform specified functions.

The term "machine-readable medium" as used herein refers to any medium that participates in providing data that causes a machine to perform a specific function. In an embodiment implemented using the computer system 400, various machine-readable media are involved, for example, in providing instructions to the processor 410 for execution. The machine-readable medium can be a storage medium, either volatile or non-volatile. A volatile medium includes, for example, dynamic memory, for example the memory 415. A non-volatile medium includes, for example, optical or magnetic disks, for example the storage unit 425. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic media, a CD-ROM, any other optical media, punchcards, papertape, any other physical media with patterns of holes, a RAM, a PROM, and EPROM, a FLASH-EPROM, any other memory chip or cartridge.

In another embodiment, the machine-readable media can be transmission media including coaxial cables, copper wire and fiber optics, including the wires that comprise the bus 405. Transmission media can also take the form of acoustic or light waves, such as those generated during radio-wave and infra-red data communications. Examples of machine-readable media may include, but are not limited to, a carrier wave as described hereinafter or any other media from which the computer system 400 can read, for example online software, download links, installation links, and online links. For example, the instructions can initially be carried on a magnetic disk of a remote computer. The remote computer can load the instructions into its dynamic memory and send the instructions over a telephone line using a modem. A modem local to the computer system 400 can receive the data on the telephone line and use an infra-red transmitter to convert the data to an infra-red signal. An infra-red detector can receive the data carried in the infra-red signal and appropriate circuitry can place the data on the bus 405. The bus 405 carries the data to the memory 415, from which the processor 410 retrieves and executes the instructions. The instructions received by the memory 415 can optionally be stored on the storage unit 425 either before or after execution by the processor 410. All such media must be tangible to enable the instructions carried by the media to be detected by a physical mechanism that reads the instructions into a machine.

The computer system 400 also includes a communication interface 445 coupled to the bus 405. The communication interface 445 provides a two-way data communication coupling to the network 450. For example, the communication interface 445 can be an integrated services digital network (ISDN) card or a modem to provide a data communication connection to a corresponding type of telephone line. As another example, the communication interface 445 can be a local area network (LAN) card to provide a data communication connection to a compatible LAN. Wireless links can also be implemented. In any such implementation, the communication interface 445 sends and receives electrical, electromagnetic or optical signals that carry digital data streams representing various types of information.

The present disclosure provides synchronization of transactional data and analytical data between data centers. The present disclosure hence solves issues concerning data security, user credentials, dependent transparency, and multi tenancy.

It is to be understood that although various components are illustrated herein as separate entities, each illustrated component represents a collection of functionalities which can be implemented as software, hardware, firmware or any combination of these. Where a component is implemented as software, it can be implemented as a standalone program, but can also be implemented in other ways, for example as part of a larger program, as a plurality of separate programs, as a kernel loadable module, as one or more device drivers or as one or more statically or dynamically linked libraries.

As will be understood by those familiar with the art, the invention may be embodied in other specific forms without departing from the spirit or essential characteristics thereof. Likewise, the particular naming and division of the portions, modules, agents, managers, components, functions, procedures, actions, layers, features, attributes, methodologies and other aspects are not mandatory or significant, and the mechanisms that implement the invention or its features may have different names, divisions and/or formats.

Furthermore, as will be apparent to one of ordinary skill in the relevant art, the portions, modules, agents, managers, components, functions, procedures, actions, layers, features, attributes, methodologies and other aspects of the invention can be implemented as software, hardware, firmware or any combination of the three. Of course, wherever a component of the present invention is implemented as software, the component can be implemented as a script, as a standalone program, as part of a larger program, as a plurality of separate scripts and/or programs, as a statically or dynamically linked library, as a kernel loadable module, as a device driver, and/or in every and any other way known now or in the future to those of skill in the art of computer programming. Additionally, the present invention is in no way limited to implementation in any specific programming language, or for any specific operating system or environment.

Furthermore, it will be readily apparent to those of ordinary skill in the relevant art that where the present invention is implemented in whole or in part in software, the software components thereof can be stored on computer readable media as computer program products. Any form of computer readable medium can be used in this context, such as magnetic or optical storage media. Additionally, software portions of the present invention can be instantiated (for example as object code or executable images) within the memory of any programmable computing device.

Accordingly, the disclosure of the present invention is intended to be illustrative, but not limiting, of the scope of the invention, which is set forth in the following claims.

What is claimed is:

1. A method of synchronizing transactional data and analytical data between data centers, the method comprising:
    receiving metadata by a transactional sniffer system from a user interface comprised in a customer data center to create and update the transactional data;
    receiving in a first ephemeral data storage unit the transactional data from a transactional system;
    forwarding the metadata from the customer data center to an analytical system in a master data center, wherein the analytical system manage analytical data including numerical values, metrics, and measurements;
    forwarding data from the customer data center to the master data center, wherein the data is encrypted with a key uniquely associated with a customer;
    detecting role creation calls by a user management sniffer system to create roles for one or more users associated with the customer data center;
    authenticating one or more metadata calls in the customer data center;
    masquerading the metadata calls, and other role sensitive calls crossing the data center boundary;
    subsequent to the authenticating, masquerading the role creation calls crossing a data center boundary;
    routing traffic from the customer data center to the master data center by an analytical proxy unit;
    managing user credentials of one or more users associated with the customer data center by a first user management unit;
    receiving the transactional data from the data forwarder unit for synchronizing the transactional data and the analytical data;
    receiving the transactional data from the transactional system in a second ephemeral data storage unit;
    enabling remote resetting of the user credentials by a credential management interface unit; and
    managing the one or more users by a second user management unit.

2. The method as claimed in claim 1, wherein forwarding the metadata comprises:
    storing the metadata in the master data center.

3. The method as claimed in claim 1, wherein forwarding the data comprises:
    storing the data in the customer data center.

4. The method of claim 1 and further comprising
managing user credentials of the one or more users associated with the customer data center.

5. The method of claim 4 and further comprising
enabling remote resetting of the user credentials of the one or more users by the master data center.

6. A multi data center system for synchronizing transactional data and analytical data, the multi data center system comprising:
a customer data center comprising:
one or more processor;
a transactional system to create and update transactional data;
a user interface unit that receives metadata;
a transactional sniffer unit that detects the metadata;
a first ephemeral data storage unit that receives the transactional data from the transactional system;
a data forwarder unit that forwards the transactional data to a master data center wherein the transactional data is encrypted with a key uniquely associated with the customer;
a metadata store that stores the metadata and the transactional data;
an authenticator for authenticating one or more metadata calls in the customer data center;
a role masquerader unit that (i) masquerades the metadata calls, and other role sensitive calls crossing the data center boundary, and that (ii) masquerades role creation calls crossing a data center boundary subsequent to the authenticating;
an analytical proxy unit that implements an interface and routes traffic from the customer data center to the master data center;
a first user management unit that manages user credentials of one or more users associated with the customer data center; and
a user management sniffer unit that detects role creation calls to create roles for the one or more users associated with the customer data center; and
the master data center comprising:
an analytical system that deals with analytical data wherein the analytical data includes numerical values, metrics, and measurements;
a metadata receiver that receives the metadata from the transactional sniffer unit;
a metadata storage unit that stores the metadata;
a data receiver unit that receives the transactional data from the data forwarder unit for synchronizing the transactional data and the analytical data;
a second ephemeral data storage unit that receives data from the transactional system;
a credential management interface unit that enables remote resetting of the user credentials; and
a second user management unit that manages the one or more users.

7. The multi data center system as claimed in claim 6, wherein the user interface unit further initiates queries that need to be serviced by the analytical system and the data forwarder unit.

8. The multi data center system as claimed in claim 6, wherein the first ephemeral data storage unit encrypts the data with a key uniquely associated with a customer.

9. A computer program product stored on a non-transitory computer-readable medium that when executed by a processor, performs a method of synchronizing transactional data and analytical data between data centers, comprising:
receiving metadata by a transactional system from a user interface comprised in a customer data center to create and update the transactional data;
receiving in a first ephemeral data storage unit the transactional data from a transactional system;
forwarding the metadata from the customer data center to an analytical system in a master data center, wherein the analytical system manages analytical data including numerical values, metrics, and measurements;
forwarding data from the customer data center to the master data center, wherein the data is encrypted with a key uniquely associated with a customer;
detecting role creation calls to create roles for one or more users associated with the customer data center;
authenticating one or more metadata calls in the customer data center;
masquerading the metadata calls, and other role sensitive calls crossing the data center boundary;
subsequent to the authenticating, masquerading the role creation calls crossing a data center boundary;
routing traffic from the customer data center to the master data center by an analytical proxy unit;
managing user credentials of one or more users associated with the customer data center by a first user management unit;
receiving the transactional data from the data forwarder unit for synchronizing the transactional data and the analytical data;
receiving the transactional data from the transactional system in a second ephemeral data storage unit;
enabling remote resetting of the user credentials by a credential management interface unit; and
managing the one or more users by a second user management unit.

10. The computer program product as claimed in claim 9, wherein forwarding the metadata comprises:
storing the metadata in the master data center.

11. The computer program product as claimed in claim 9, wherein forwarding the data comprises:
storing the data in the customer data center.

12. The computer program product of claim 9 and further comprising
managing user credentials of the one or more users associated with the customer data center.

13. The computer program product of claim 12 and further comprising
enabling remote resetting of the user credentials of the one or more users by the master data center.

* * * * *